(12) United States Patent
Ohno et al.

(10) Patent No.: US 12,565,171 B2
(45) Date of Patent: Mar. 3, 2026

(54) OCCUPANT RESTRAINT DEVICE FOR VEHICLE

(71) Applicant: TOYOTA JIDOSHA KABUSHIKI KAISHA, Toyota (JP)

(72) Inventors: Mitsuyoshi Ohno, Miyoshi (JP); Katsuya Shimazu, Toyota (JP); Daiki Furukawa, Toyota (JP); Kaname Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/063,733

(22) Filed: Feb. 26, 2025

(65) Prior Publication Data

US 2025/0282321 A1      Sep. 11, 2025

(30) Foreign Application Priority Data

Mar. 6, 2024      (JP) ................................. 2024-034379

(51) Int. Cl.
| | |
|---|---|
| *B60R 22/14* | (2006.01) |
| *B60R 21/18* | (2006.01) |
| *B60R 21/00* | (2006.01) |

(52) U.S. Cl.
CPC .............. *B60R 22/14* (2013.01); *B60R 21/18* (2013.01); *B60R 2021/0044* (2013.01); *B60R 2021/0058* (2013.01)

(58) Field of Classification Search
CPC ..................................................... B60R 21/18
See application file for complete search history.

(56) References Cited

U.S. PATENT DOCUMENTS

| | | | | |
|---|---|---|---|---|
| 3,905,615 | A | * | 9/1975 | Schulman ............... B60R 21/18 280/730.1 |
| 3,948,541 | A | * | 4/1976 | Schulman ............... B60R 21/18 244/122 B |
| 2015/0054264 | A1 | * | 2/2015 | Hirako .................... B60R 21/18 280/728.3 |
| 2017/0080887 | A1 | * | 3/2017 | Evans ................... B60N 2/4242 |
| 2019/0016288 | A1 | * | 1/2019 | Schneider ............... B60R 21/18 |
| 2019/0176738 | A1 | * | 6/2019 | Kim ........................ B60R 22/14 |
| 2019/0176744 | A1 | * | 6/2019 | Yoo ......................... B60R 21/18 |

(Continued)

FOREIGN PATENT DOCUMENTS

| | | | | | |
|---|---|---|---|---|---|
| CN | 115768662 | A | * | 3/2023 | ........... B60R 21/233 |
| CN | 117500701 | A | * | 2/2024 | ....... B60R 21/23138 |

(Continued)

*Primary Examiner* — Nicole T Verley
(74) *Attorney, Agent, or Firm* — Dinsmore & Shohl LLP

(57) ABSTRACT

The occupant restraint device for a vehicle includes a seatbelt, which restrains an occupant P sitting on a vehicle seat at the vehicle seat, and a belt backing airbag. When gas is supplied to the belt backing airbag from an inflator at a time of frontal collision of the vehicle, the belt backing airbag inflates and expands between at least the shoulder belt of the seatbelt and the shoulder area of the occupant. Together with moving to a vehicle front side to follow the occupant moving to the vehicle front side due to inertial force, the belt backing airbag moves along the shoulder belt and maintains the state in which the belt backing airbag is interposed between at least the shoulder area of the occupant and the shoulder belt.

12 Claims, 11 Drawing Sheets

(56) References Cited

U.S. PATENT DOCUMENTS

| | | | | |
|---|---|---|---|---|
| 2019/0193672 A1 | 6/2019 | Ohno et al. | | |
| 2021/0094496 A1 * | 4/2021 | Tanaka | .................... | B60R 21/20 |
| 2021/0300278 A1 * | 9/2021 | Hayashi | ................. | B60R 21/18 |
| 2021/0354647 A1 | 11/2021 | Steinke et al. | | |
| 2022/0063555 A1 * | 3/2022 | Kanegae | ............... | B60R 21/0136 |
| 2022/0297626 A1 * | 9/2022 | Meador | ................... | B60R 22/28 |
| 2024/0300438 A1 | 9/2024 | Shimazu et al. | | |
| 2025/0058734 A1 * | 2/2025 | Ohno | ................... | B60R 21/233 |

FOREIGN PATENT DOCUMENTS

| | | | | | |
|---|---|---|---|---|---|
| DE | 4116162 A1 * | 11/1992 | ............. | B60R 21/18 | |
| DE | 102017216180 A1 | 3/2019 | | | |
| DE | 102018123633 A1 * | 3/2020 | ............. | B60R 21/23 | |
| JP | 2015-217740 A | 12/2015 | | | |
| JP | 2018-034559 A | 3/2018 | | | |
| JP | 2018-047790 A | 3/2018 | | | |
| JP | 2019-116265 A | 7/2019 | | | |
| JP | 2020062923 A * | 4/2020 | | | |
| JP | 6873961 B2 * | 5/2021 | | | |
| JP | 2023042378 A * | 3/2023 | | | |
| JP | 2024-128880 A | 9/2024 | | | |
| KR | 102569645 B1 * | 8/2023 | ........... | B60R 21/207 | |
| WO | WO-9944865 A1 * | 9/1999 | ............. | B60R 22/14 | |
| WO | WO-2020017280 A1 * | 1/2020 | ........ | B60R 21/2338 | |
| WO | WO-2020017282 A1 * | 1/2020 | ........ | B60R 21/2338 | |
| WO | 2020/057992 A1 | 3/2020 | | | |
| WO | WO-2020064449 A1 * | 4/2020 | ............. | B60R 21/23 | |
| WO | WO-2021220885 A1 * | 11/2021 | ........ | B60R 21/2338 | |
| WO | WO-2022215543 A1 * | 10/2022 | ....... | B60R 21/23138 | |

* cited by examiner

OCCUPANT RESTRAINT DEVICE FOR VEHICLE

CROSS-REFERENCE TO RELATED APPLICATION

This application is based on and claims priority under 35 USC 119 from Japanese Patent Application No. 2024-034379 filed on Mar. 6, 2024, the disclosure of which is incorporated by reference herein.

BACKGROUND

Technical Field

The present disclosure relates to an occupant restraint device for a vehicle.

Related Art

An occupant restraint device for a vehicle has been known since heretofore, such as, for example, Japanese Patent Application Laid-Open (JP-A) No. 2018-047790, in which an airbag that inflates in a thickness direction of a shoulder belt at a time of frontal collision of the vehicle is provided in a range along the shoulder belt from a belt guide disposed at an upper portion of a seat back to a shoulder area of the occupant. Thus, the shoulder area of the occupant is restrained, the shoulder belt is lifted from the chest area, and an applied load acting on the chest area of the occupant from the shoulder belt is moderated.

However, a rear end portion of an airbag as described above is fixed at the belt guide. Therefore, at a time of frontal collision of the vehicle, the airbag may not move to the vehicle front side to follow the occupant who is moving to a vehicle front side due to inertial force, and the airbag may not be retained at the targeted shoulder area vicinity of the occupant.

Moreover, the airbag may not be retained at a suitable position due to differences in physical build of occupants.

SUMMARY

The present disclosure provides an occupant restraint device for a vehicle that may continuously restrain a shoulder area of an occupant with a belt backing airbag, with a shoulder belt acting as a reaction force member, regardless of differences in physical build of occupants.

An occupant restraint device for a vehicle according to a first aspect relating to the present disclosure includes: a seatbelt that restrains an occupant sitting on a vehicle seat at the vehicle seat; and a belt backing airbag that, when gas is supplied to the belt backing airbag from an inflator at a time of frontal collision of the vehicle, inflates and expands between at least a shoulder belt of the seatbelt and a shoulder area of the occupant, the belt backing airbag moving along the shoulder belt together with moving to a vehicle front side to follow the occupant moving to the vehicle front side due to inertial force, and the belt backing airbag maintaining a state in which the belt backing airbag is interposed between at least the shoulder area of the occupant and the shoulder belt.

According to the first aspect, when the gas is supplied from the inflator at a time of frontal collision of the vehicle, the belt backing airbag inflates and expands at least between the shoulder belt of the seatbelt and the shoulder area of the occupant. The belt backing airbag moves to the vehicle front side to follow the occupant moving to a vehicle front side due to inertial force, and maintains the state of being interposed between at least the shoulder area of the occupant and the shoulder belt. That is, the belt backing airbag moves to an inflection position of the shoulder belt at the shoulder area of the occupant and continues to be disposed at the targeted shoulder area of the occupant.

Therefore, at the time of frontal collision of the vehicle, regardless of physical build of the occupant, the belt backing airbag continues to be retained between the shoulder belt and the shoulder area of the occupant, the shoulder belt of the seatbelt acts as a member that receives reaction force of the belt backing airbag from an early stage to a later stage of occupant restraint, and at least the shoulder area of the occupant is continuingly restrained. Note that the meaning of the term "at a time of frontal collision" of the vehicle as used herein is intended to include an estimation (prediction) that a frontal collision of the vehicle is unavoidable.

In an occupant restraint device for a vehicle according to a second aspect relating to the present disclosure, in the occupant restraint device for a vehicle according to the first aspect, the belt backing airbag is linked to the vehicle seat or a vehicle body via a cord-shaped member that is resiliently deformable so as to extend to follow movement of the occupant to the vehicle front side.

According to the second aspect, the belt backing airbag is linked to the vehicle seat or the vehicle body via the cord-shaped member that is resiliently deformable so as to extend to follow movement of the occupant to the vehicle front side. Therefore, at a time of frontal collision of the vehicle, regardless of physical build of the occupant, the belt backing airbag is continuingly disposed between the shoulder belt and the shoulder area of the occupant due to restoring force of the cord-shaped member, and at least the shoulder area of the occupant continues to be restrained from an early stage to a later stage of occupant restraint.

In an occupant restraint device for a vehicle according to a third aspect relating to the present disclosure, in the occupant restraint device for a vehicle according to the second aspect, the belt backing airbag is connected with the inflator via a gas supply tube that is extensible to follow the movement of the occupant to the vehicle front side.

According to the third aspect, the belt backing airbag is connected with the inflator via the gas supply tube that is capable of extending to follow movement of the occupant to the vehicle front side. Therefore, at a time of frontal collision of the vehicle, there is no risk of a position of the belt backing airbag that is moving to a vehicle front side being limited by the gas supply tube, and the belt backing airbag may be continuingly disposed between the shoulder belt and the shoulder area of the occupant regardless of physical build of the occupant.

In an occupant restraint device for a vehicle according to a fourth aspect relating to the present disclosure, in the occupant restraint device for a vehicle according to the second or third aspect, the belt backing airbag includes a slip cloth interposed between the occupant and the belt backing airbag.

According to the fourth aspect, the slip cloth is interposed between the belt backing airbag and the occupant. Therefore, at a time of frontal collision of the vehicle, the belt backing airbag moving to a vehicle front side moves along the shoulder belt easily. That is, the belt backing airbag easily moves to the inflection position of the shoulder belt at the shoulder area of the occupant.

In an occupant restraint device for a vehicle according to a fifth aspect relating to the present disclosure, in the occupant restraint device for a vehicle according to the fourth aspect, a lower end portion of the slip cloth is fixed to a lower portion of the belt backing airbag at a side thereof at which the occupant is disposed.

According to the fifth aspect, the lower end portion of the slip cloth is fixed to the lower portion of the belt backing airbag at a side of the slip cloth at which the occupant is disposed. Therefore, at a time of frontal collision of the vehicle, the belt backing airbag moving to a vehicle front side may move quickly along the shoulder belt. That is, the belt backing airbag may be quickly moved to the inflection position of the shoulder belt at the shoulder area of the occupant.

In an occupant restraint device for a vehicle according to a sixth aspect relating to the present disclosure, in the occupant restraint device for a vehicle according to any one of the second to fifth aspects, the seatbelt is structured to enable pulling out from a belt aperture portion provided at a pillar, a belt guide is provided at a seat back of the vehicle seat, and a belt path is corrected by the belt guide such that the shoulder belt is worn at a front side of the shoulder area of the occupant.

According to the sixth aspect, the seatbelt is structured to enable pulling out of the seatbelt through the belt aperture portion provided at the pillar, and the belt path is corrected by the belt guide provided at the seat back of the vehicle seat such that the shoulder belt is worn on the front side of the shoulder area of the occupant. Therefore, even though the seatbelt is not integrated with the vehicle seat, the belt backing airbag may be disposed between the shoulder belt and the shoulder area of the occupant regardless of physical build of the occupant, and at least the shoulder area of the occupant continues to be restrained.

In an occupant restraint device for a vehicle according to a seventh aspect relating to the present disclosure, in the occupant restraint device for a vehicle according to any one of the second to sixth aspects, the belt backing airbag inflates and expands so as to extend in a seat width direction and restrains both shoulder areas of the occupant, together with which at least one of a height or a thickness at least at an end portion of the belt backing airbag at a side of the shoulder belt is increased more than at other portions of the belt backing airbag.

According to the seventh aspect, the belt backing airbag inflates and expands so as to extend in the seat width direction and restrains both shoulder areas of the occupant. At the time of inflation and expansion, the at least one of a height or a thickness of the end portion of the belt backing airbag, at least at the side at which the shoulder belt is disposed, is increased more than at other portions. Therefore, compared to a structure in which a height or a thickness of the end portion of the belt backing airbag at a side that is disposed at the shoulder belt are the same as at other portions, at least one of an interference amount and restraint force of the belt backing airbag on the shoulder area of the occupant at the side at which the shoulder belt is disposed may be increased. As a result, the belt backing airbag is easily kept at the inflection position of the shoulder belt at the shoulder area of the occupant regardless of physical build of the occupant.

In an occupant restraint device for a vehicle according to an eighth aspect relating to the present disclosure, in the occupant restraint device for a vehicle according to any one of the second to sixth aspects, a shape in a front view of the belt backing airbag at completion of inflation and expansion is formed as at least one of a shape that covers the shoulder area of the occupant along the shoulder belt, a shape that covers both shoulder areas and a chest area of the occupant, or a shape that covers from the chest area to a head area of the occupant.

According to the eighth aspect, the shape in front view of the belt backing airbag at completion of inflation and expansion is formed as a shape that covers the shoulder area of the occupant along the shoulder belt, a shape that covers both shoulder areas and the chest area of the occupant, or a shape that covers from the chest area to the head area of the occupant. Therefore, the shoulder area, chest area and head area of the occupant may each be protected effectively.

According to the present disclosure as described above, at a time of frontal collision of the vehicle, a shoulder area of an occupant may be continuingly restrained by the belt backing airbag with the shoulder belt acting as a reaction force member, regardless of differences in physical build of occupants.

BRIEF DESCRIPTION OF THE DRAWINGS

Exemplary embodiments of the present disclosure will be described in detail based on the following figures, wherein.

DETAILED DESCRIPTION

Figure 1:
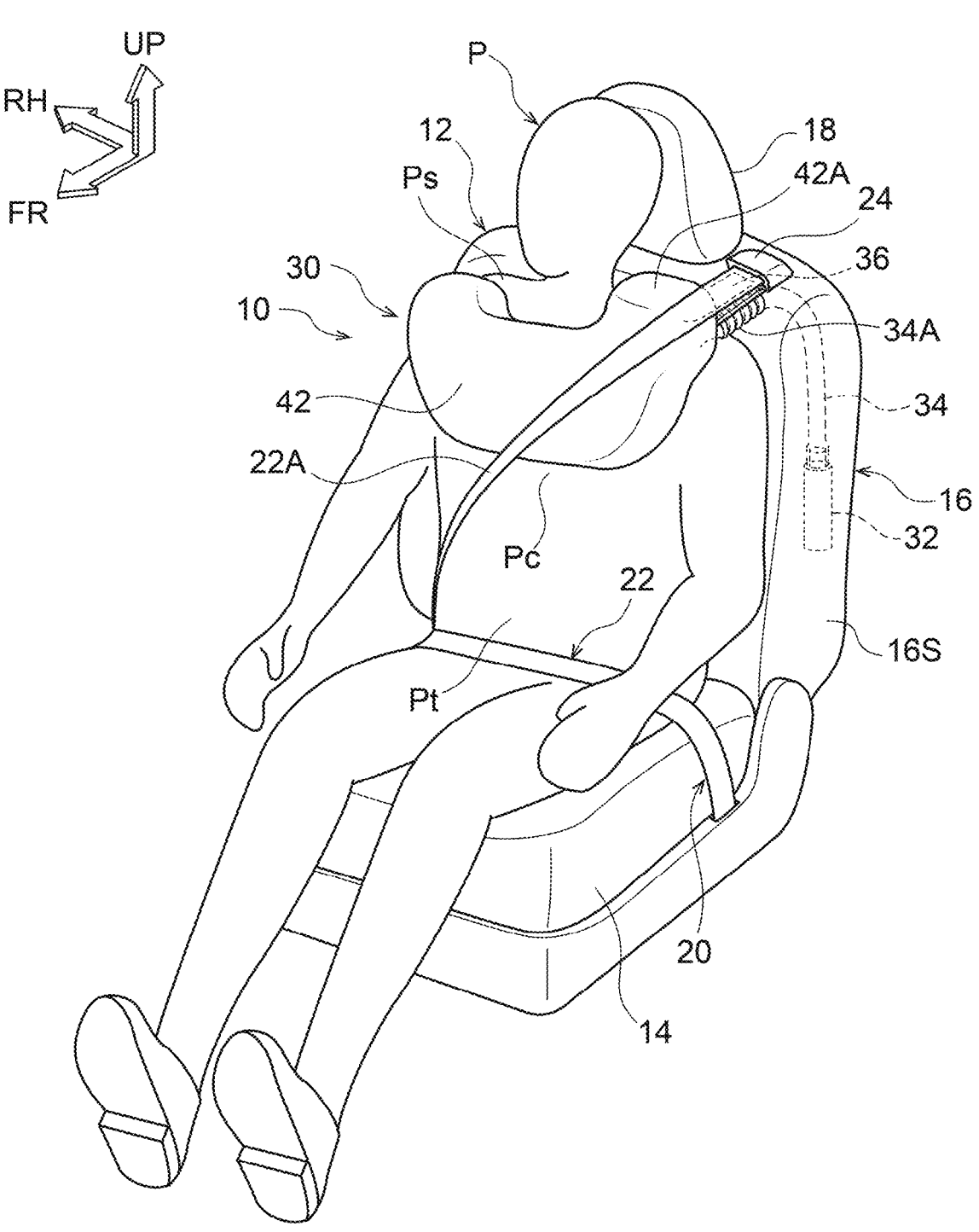
FIG. 1 is a schematic perspective view showing a state of a belt backing airbag of an occupant restraint device for a vehicle according to a first exemplary embodiment at a time of inflation and expansion.

Below, exemplary embodiments relating to the present disclosure are described in detail in accordance with the drawings. For convenience of description, the arrow UP that is shown where appropriate in the drawings indicates an upper direction of a vehicle and a vehicle seat, an arrow FR indicates a front direction of the vehicle and vehicle seat, and an arrow RH indicates a right direction of the vehicle and vehicle seat. Where the directions upper, lower, front, rear, left and right are used in the descriptions below without being particularly specified, the same represent upper, lower, front, rear, left and right of the vehicle and the vehicle seat. The left-and-right direction is equivalent to a vehicle width direction and a seat width direction.

First Exemplary Embodiment

Figure 2:
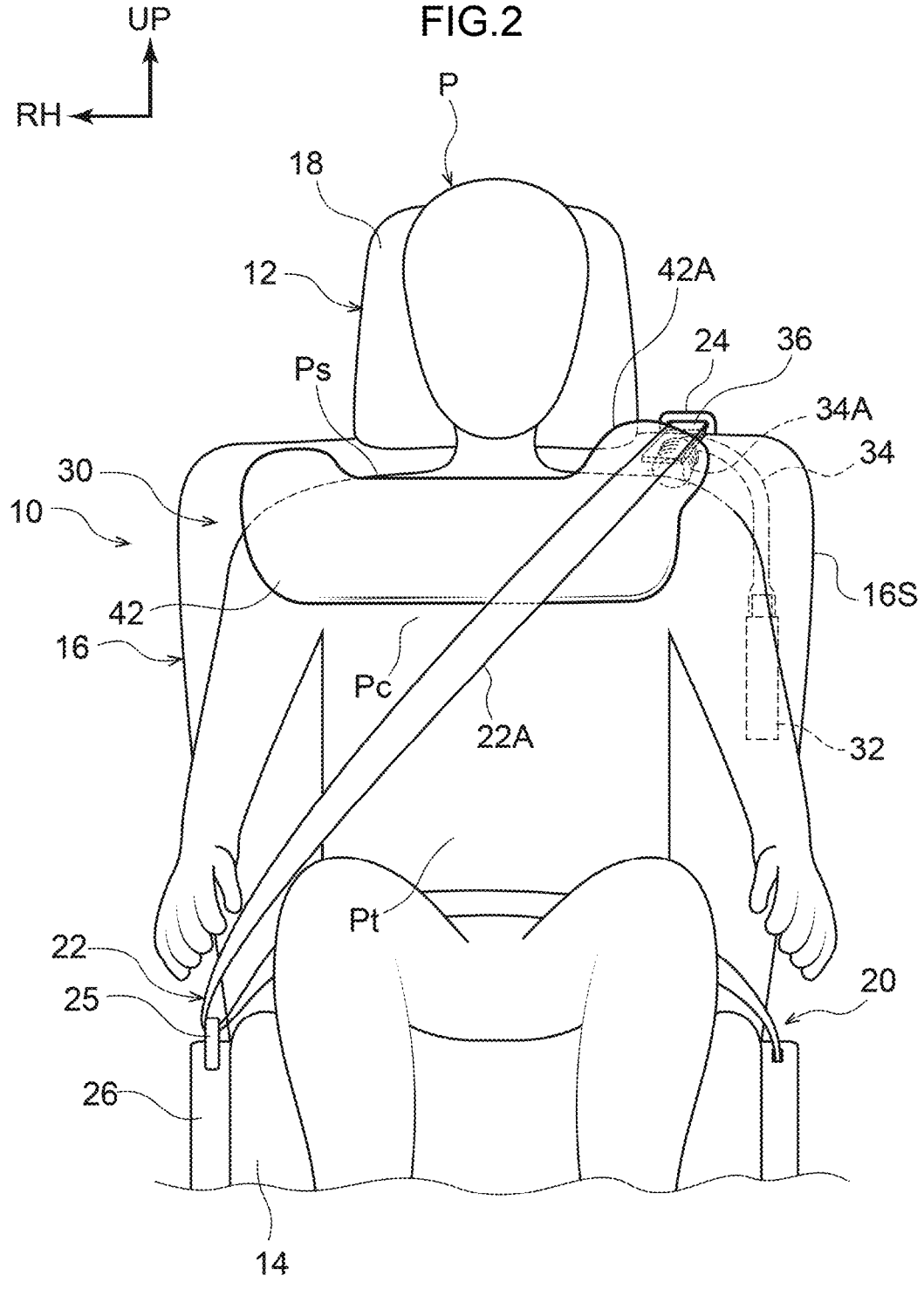
FIG. 2 is a schematic front view showing the state of the belt backing airbag of the occupant restraint device for a vehicle according to the first exemplary embodiment at the time of inflation and expansion.
Figure 3:
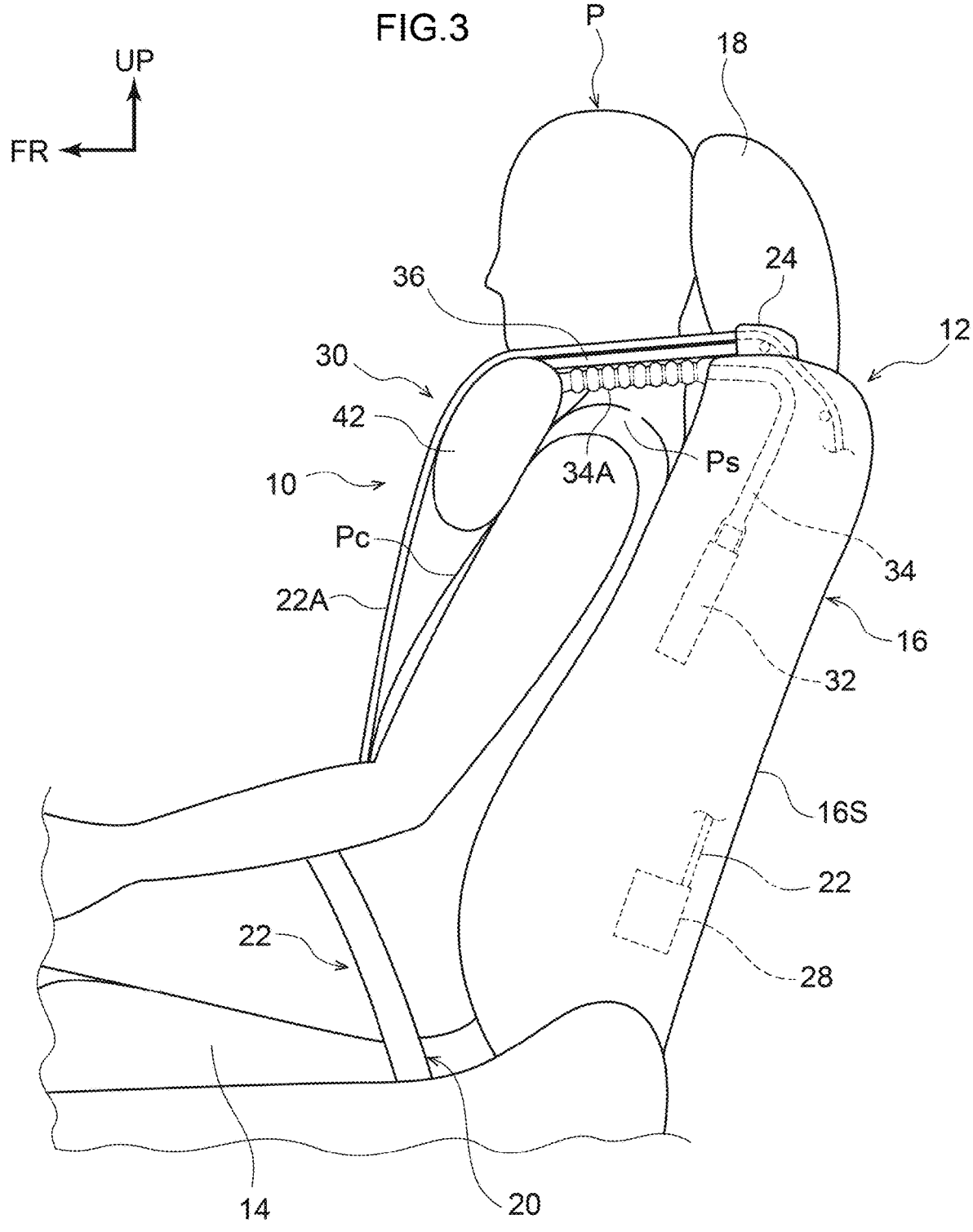
FIG. 3 is a schematic side view showing the state of the belt backing airbag of the occupant restraint device for a vehicle according to the first exemplary embodiment at the time of inflation and expansion.

First, a first exemplary embodiment is described. As shown in FIG. 1 to FIG. 3, an occupant restraint device for a vehicle 10 according to the first exemplary embodiment is provided at a vehicle seat 12. The vehicle seat 12 is a front seat or a rear seat of a vehicle (a car). In this exemplary embodiment, a front seat serves as the vehicle seat 12. The vehicle seat 12 includes a seat cushion 14, a seat back 16 and a headrest 18. The seat back 16 is provided at a rear end portion of the seat cushion 14 to be turnable about an axis in the seat width direction. The headrest 18 is provided at an upper end portion of the seat back 16 to be capable of being raised and lowered.

FIG. 1 and so forth depict a state in which a crash test dummy (a human body dummy) serving as a model of a vehicle occupant (seat occupant) who should be protected is seated on the vehicle seat 12. The dummy is, for example, a frontal crash test dummy (Hybrid III), AM 50 (the 50th percentile of American adult males). The dummy is seated in a standard sitting attitude designated for impact testing, and the vehicle seat 12 is disposed at a standard specified position corresponding to the sitting attitude. Below, the dummy is referred to as "the occupant P". The occupant P includes a shoulder area Ps, a chest area Pc, and an abdomen area Pt.

As shown in FIG. 1 to FIG. 3, the occupant P sitting on the seat cushion 14 of the vehicle seat 12 is restrained at the vehicle seat 12 by a seatbelt (webbing) 22 provided at a seatbelt apparatus 20. The seatbelt apparatus 20 is a three-point seatbelt apparatus and is what is known as an integrated seatbelt apparatus. Below, a portion of the seatbelt 22 extending from a shoulder area Ps to a chest area Pc of the occupant P is referred to as a shoulder belt 22A.

A bezel 24 that is a gateway for the seatbelt 22 is provided at a vehicle width direction outer side (seat width direction one end portion side) of an upper end face of the seat back 16. A buckle 26 is provided at the vehicle width direction inner side (seat width direction other end portion side) of the seat cushion 14. The buckle 26 is attachable to a tongue 25 provided at the seatbelt 22 (see FIG. 2). A retractor 28 that takes up one end portion side of the seatbelt 22 (see FIG. 3) is provided at a lower portion of a side frame (not shown in the drawings) at the vehicle width direction outer side, which is provided inside the seat back 16. A pre-tensioner mechanism and a force limiter mechanism are provided at the retractor 28.

An airbag device 30 is provided at the vehicle seat 12. The airbag device 30 is provided with an inflator 32, a belt backing airbag 42, and a gas supply tube 34, which is described below. The inflator 32 is embedded in a side portion 16S at the vehicle width direction outer side of the seat back 16. At usual times, the belt backing airbag 42 is accommodated inside a cover member 40 (see FIG. 4 and FIG. 5) in a folded up state. The gas supply tube 34 connects the belt backing airbag 42 with the inflator 32 and supplies gas from the inflator 32 to the belt backing airbag 42.

As shown in FIGS. 4A-4B and FIGS. 5A-5B, the cover member 40 is attached by sewing or the like to a holder member 37 made of cloth, which retains a guide member 38 in which the shoulder belt 22A is movably inserted. The cover member 40 covers around this holder member 37, the belt backing airbag 42, an extension and contraction portion 34A of the gas supply tube 34, and the shoulder belt 22A. The belt backing airbag 42 is disposed at the side of the guide member 38 at which the occupant P is disposed. The extension and contraction portion 34A is described below. The shoulder belt 22A opposes the shoulder area Ps of the occupant P. The cover member 40 is structured such that at least the side thereof at which the occupant P is disposed ruptures in association with inflation and expansion of the belt backing airbag 42.

The guide member 38 is formed in a flattish rectangular tube shape of, for example, a silicon-based resin material with a high slidability characteristic, so as to facilitate movement (sliding) of the shoulder belt 22A. The holder member 37 is attached by arbitrary fixing device to a periphery face of the guide member 38, excluding the side thereof at which the occupant P is disposed. With this guide member 38, a structure is formed in which the shoulder belt 22A does not touch the extension and contraction portion 34A of the gas supply tube 34. Thus, at times of wearing and removal of the seatbelt 22, no external force acts on the extension and contraction portion 34A of the gas supply tube 34.

The inflator 32 is, for example, a substantially cylindrical sealed gas-type (cold-type) cylinder inflator. The inflator 32 is activated by a control unit provided in the vehicle, which is not shown in the drawings, when a frontal collision of the vehicle is detected or a frontal collision is estimated (predicted) to be unavoidable (below, "at the time of frontal collision of the vehicle") by a collision sensor, which is not shown in the drawings, and which may be a camera and the like. When activated, the inflator 32 produces the gas.

That is, the control unit is electronically connected to the inflator 32 and the collision sensor. At the time of frontal collision of the vehicle, the control device activates the inflator 32 on the basis of information from the collision sensor. Modes of frontal collision of the vehicle in which the control unit activates the inflator 32 include, in addition to a full-overlap frontal collision, offset frontal collisions such as an oblique collision, a small-overlap frontal collision and so forth.

The inflator 32 is attached to, for example, the side frame at the vehicle width direction outer side of the seat back 16 together with the retractor 28, with an axial direction of the inflator 32 substantially in the vertical direction. One end portion of the gas supply tube 34 is structured by, for example, a flexible tube or the like. The one end portion of the gas supply tube 34 is connected to be in fluid communication with a jetting out aperture, which is an upper end portion of the inflator 32. The other end portion of the gas supply tube 34 projects from the seat back 16 at the lower side of the bezel 24 and is connected to be in fluid communication with the belt backing airbag 42.

Figure 6:
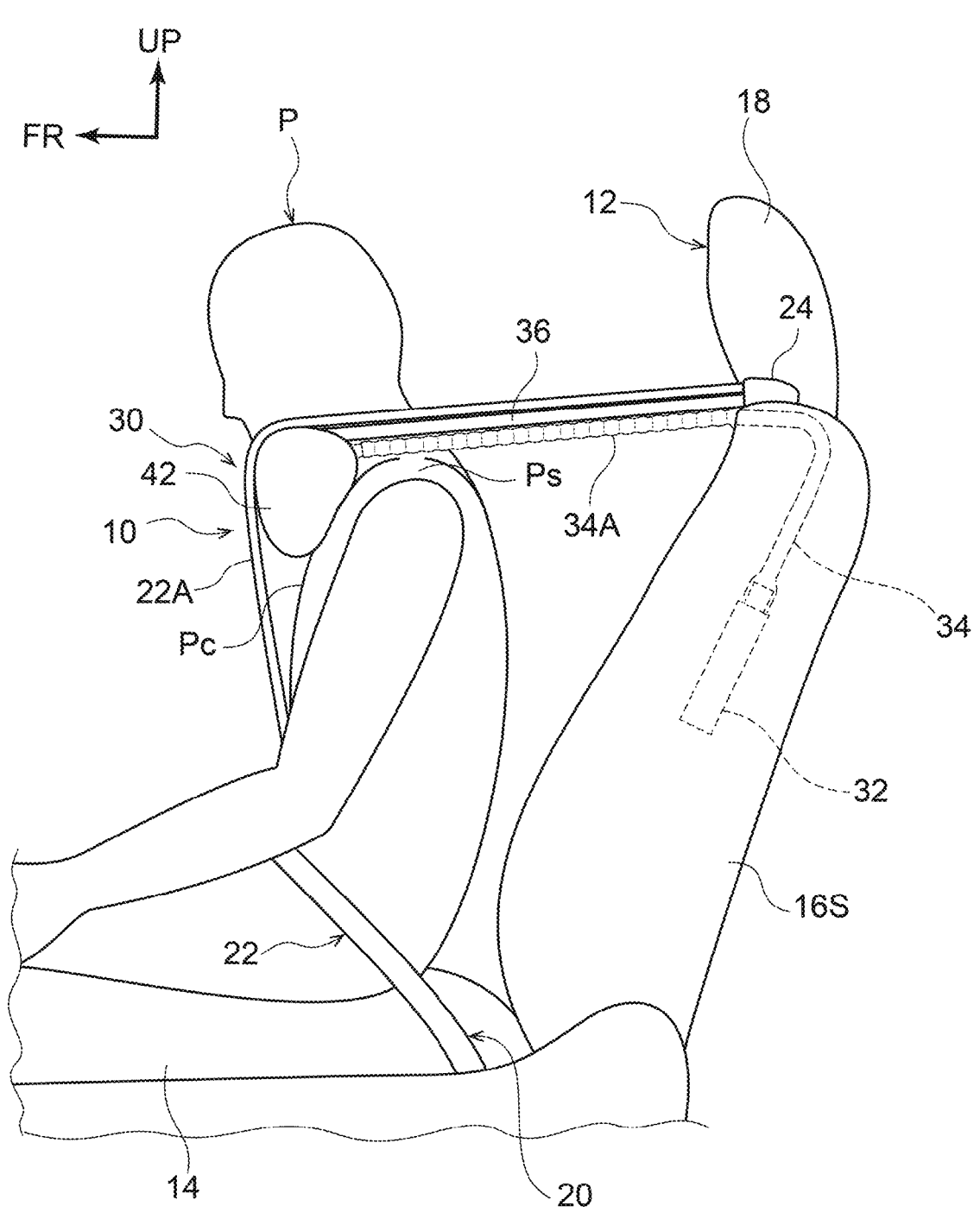
FIG. 6 is a schematic side view showing a time of occupant restraint of the occupant restraint device for a vehicle according to the first exemplary embodiment.

As shown in FIG. 6, in order to supply gas from the inflator 32 to the belt backing airbag 42, a portion of the gas supply tube 34 at the side thereof at which the belt backing airbag 42 is disposed, that is, a predetermined partial region of the gas supply tube 34 protruding from the seat back 16 serves as the extension and contraction portion 34A, which is structured to be capable of extending to follow movement of the belt backing airbag 42 to the front side.

To describe this more specifically, the extension and contraction portion 34A of the gas supply tube 34 that projects from the seat back 16 is formed in a concertina shape and is capable of extending under a predetermined tension load. Thus, when the belt backing airbag 42 is supplied with gas and inflates and expands, the extension and contraction portion 34A of the gas supply tube 34 widens to a predetermined outer diameter, enabling a fast and stable gas supply. Then, when the belt backing airbag 42 moves to the front side in association with a movement of the occupant P to the front side, the extension and contraction portion 34A of the gas supply tube 34 extends and contracts in diameter to a predetermined internal diameter.

Because of the extension and contraction portion 34A contracting in diameter, the gas supply tube 34 fulfills the role of a check valve and gas is unlikely to flow back from the interior of the belt backing airbag 42. The extension and contraction portion 34A of the gas supply tube 34 is structured so as to extend under a lower load than a force limiter load of the force limiter mechanism provided at the retractor 28. The portion of the gas supply tube 34 that projects from the seat back 16 is not limited to being the extension and contraction portion 34A formed in the concertina shape. Although not illustrated, this portion may be, for example, an extra length portion that is extendable to the same extent as the extension and contraction portion 34A.

Figure 4A:
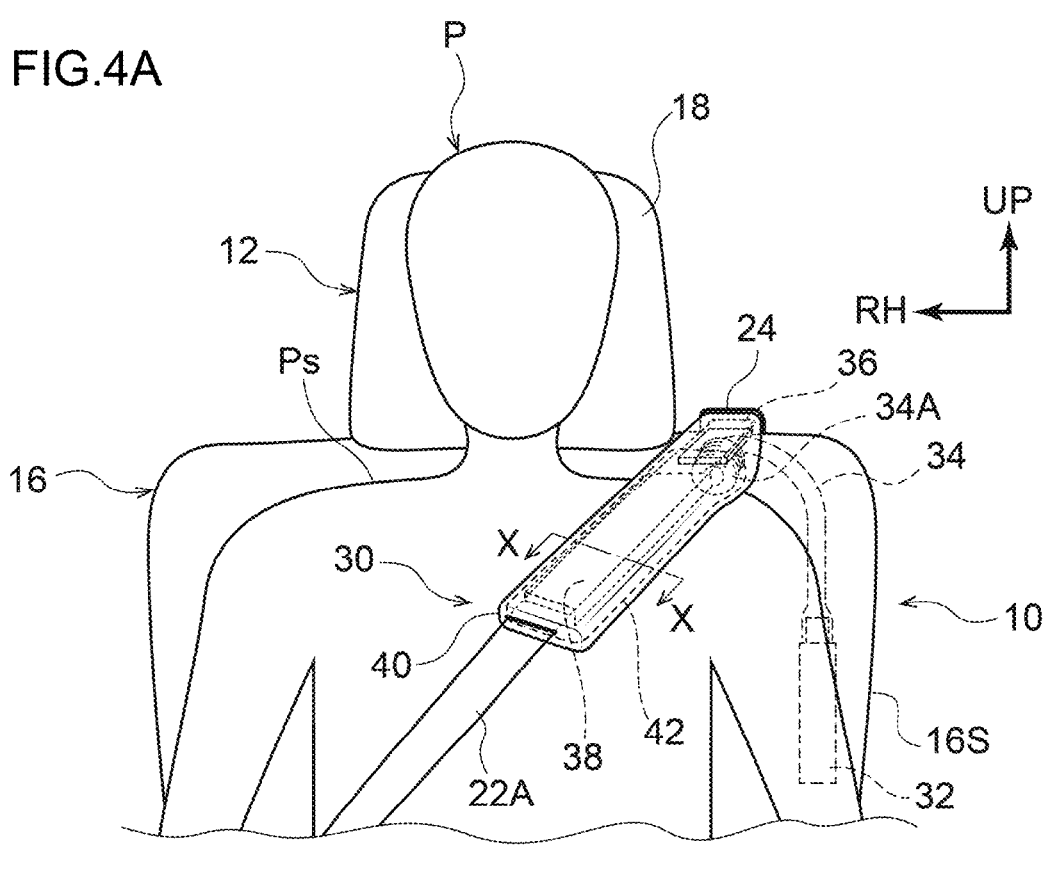
FIG. 4A is a schematic front view showing a state of the belt backing airbag of the occupant restraint device for a vehicle according to the first exemplary embodiment at a usual time.
Figure 4B:
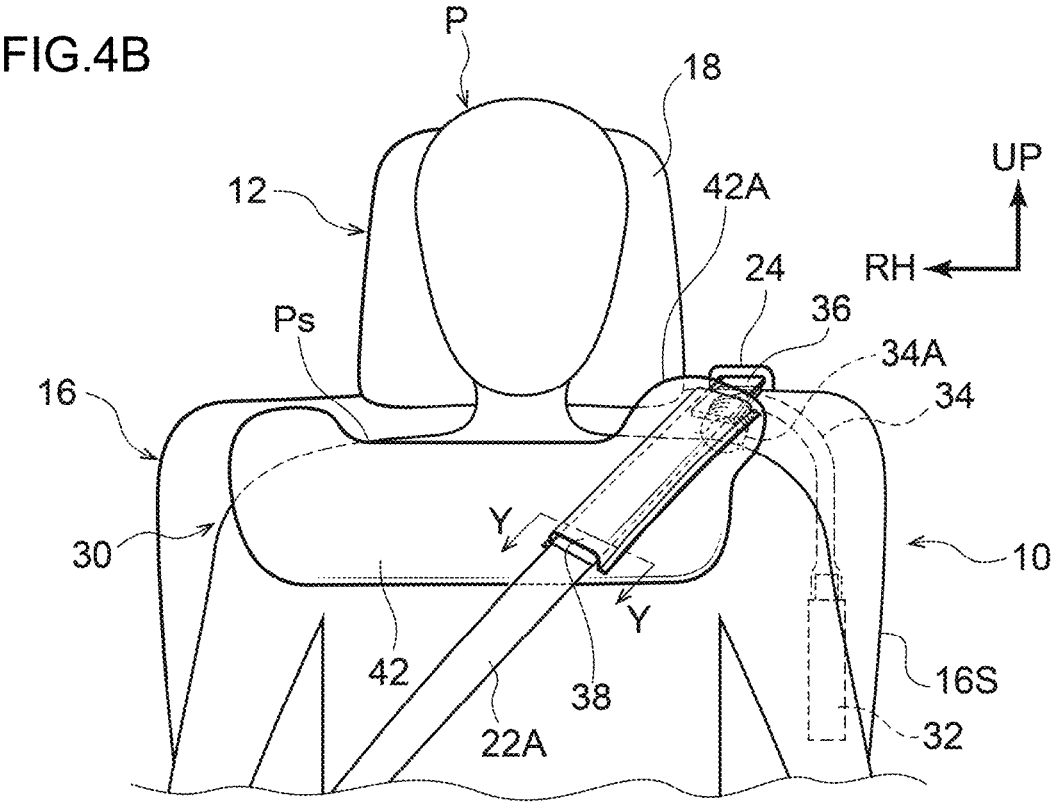
FIG. 4B is a schematic front view showing a state of the belt backing airbag of the occupant restraint device for a vehicle according to the first exemplary embodiment at a time of inflation and expansion.
Figure 5A:
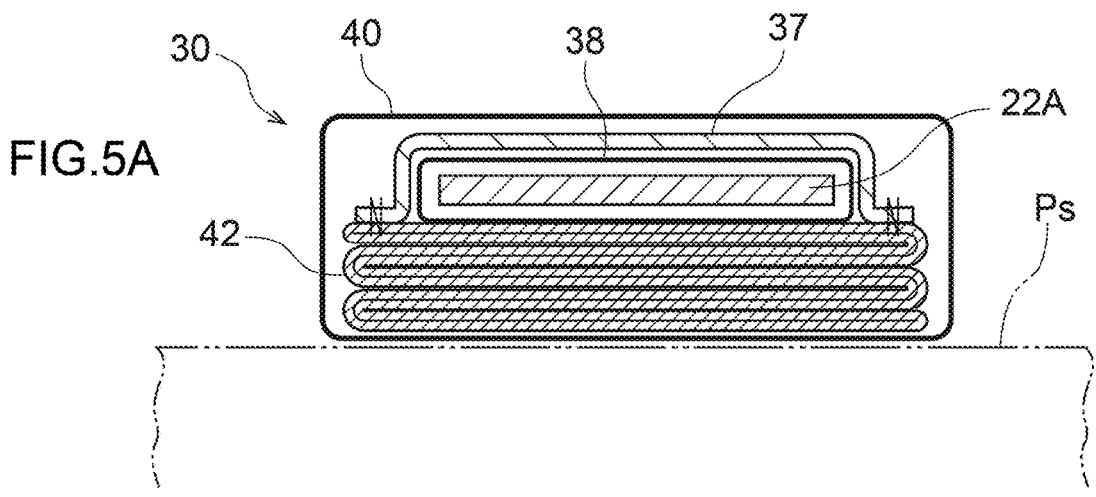
FIG. 5A is a schematic magnified sectional diagram cut along line X-X in FIG. 4A.
Figure 5B:
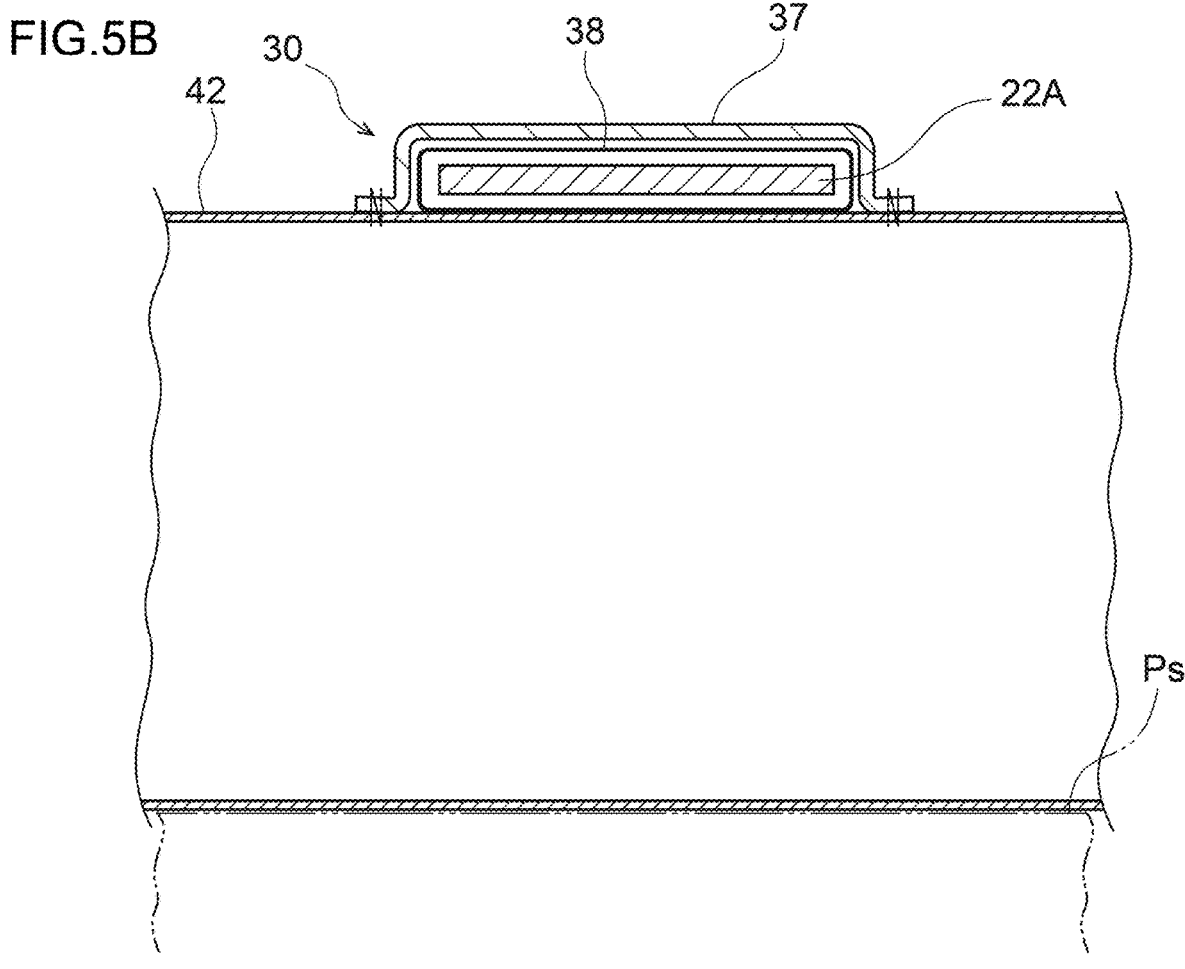
FIG. 5B is a schematic magnified sectional diagram cut along line Y-Y in FIG. 4B.

As shown in FIG. 4A, when the extension and contraction portion 34A of the gas supply tube 34 is accommodated inside the cover member 40, the concertina-shaped portion is in a contracted state. However, the extension and contraction portion 34A may be in a shape that is squashed along the shoulder belt 22A. That is, the extension and contraction portion 34A of the gas supply tube 34 in a squashed shape and the folded up belt backing airbag 42 may both be accommodated inside the cover member 40.

The belt backing airbag 42 is formed in a bag shape by two front and rear base cloths being superposed and peripheral edge portions thereof being sewn to one another. The two base cloths have substantially rectangular shapes in elevation view with longer directions in the seat width direction. Thus, as shown in FIG. 1 to FIG. 3, the belt backing airbag 42 after the completion of inflation and expansion is structured as a single chamber with a substantially circular tube shape whose length direction (axial direction) is in the seat width direction. The length of the belt backing airbag 42 in the axial direction is set to a length capable of opposing both shoulder areas Ps of the occupant P in the front-and-rear direction. The base cloths are composed of, for example, a polyamide- or polyester-based fabric.

In this structure, the gas from the inflator is supplied to the belt backing airbag 42 via the gas supply tube 34 that passes through the lower side of the bezel 24. Therefore, the belt backing airbag 42 inflates and expands so as to extend in the seat width direction at least between the shoulder belt 22A and both shoulder areas Ps of the occupant P. The belt backing airbag 42 moves to follow to the front side in a shape that is pressed by the occupant P moving to a front side due to inertial force, and the belt backing airbag 42 may restrain both shoulder areas Ps of the occupant P including at least the clavicles.

An upward extension portion 42A is formed at least at an end portion of the belt backing airbag 42 at the side thereof that is disposed at the shoulder belt 22A (the vehicle width direction outer side). The upward extension portion 42A opposes an upper face of the shoulder area Ps at the side of the occupant at which the shoulder belt 22A is disposed. That is, the belt backing airbag 42 is formed such that a height of at least the end portion at the side that is disposed at the shoulder belt 22A is greater than at other portions of the belt backing airbag 42, for example, a height of an end portion of the belt backing airbag 42 at the side away from the shoulder belt (the vehicle width direction inner side). At least the end portion of the belt backing airbag 42 at the side that is disposed at the shoulder belt 22A may also be formed with a thickness that is thicker than the other portions. It is sufficient that at least one of a height or a thickness is increased more than at the other portions.

A strap 36 serves as a cord-shaped member that is formed with a predetermined length and width. As shown in FIG. 1 to FIG. 3, one end portion of the strap 36 is attached to an upper end portion of the belt backing airbag 42 at the side that is disposed at the shoulder belt 22A (the upward extension portion 42A). The other end portion of the strap 36 is attached to the vehicle seat 12. More specifically, the other end portion of the strap 36 is attached to the bezel 24, a headrest stay (not shown in the drawings) or the like.

The strap 36 is formed of a resilient body of extensible rubber or the like. The strap 36 is structured to be capable of resiliently deforming so as to extend under a predetermined tension load, more specifically to follow movement of the occupant P to the front side. In association with the movement of the occupant P to the front side, the belt backing airbag 42 is pulled by a resilient restoring force of the strap 36 and moves along the shoulder belt 22A to the upper side (more specifically, to the upper side and rear side).

In other words, the position of the belt backing airbag 42 is adjusted by the strap 36 to suit the physical build of the occupant P. As a result, the belt backing airbag 42 is maintained in the state of being interposed between at least the shoulder area Ps of the occupant P and the shoulder belt 22A, and the belt backing airbag 42 can be continuingly disposed at positions opposing both shoulder areas Ps of the occupant including at least the clavicles. That is, the belt backing airbag 42 continues to restrain at least both shoulder areas Ps including the clavicles of the occupant P.

The following operations are described for the occupant restraint device for a vehicle 10 according to the first exemplary embodiment with the structure described above. Note that the guide member 38 and the cover member 40 are not shown in the drawings of FIG. 1 to FIG. 3.

At a time of a frontal collision of the vehicle, the inflator 32 is activated by control from the control unit. Thus, gas is jetted out from the inflator 32. The gas jetted out from the inflator 32 is supplied through the gas supply tube 34 into the belt backing airbag 42. That is, the gas is supplied to the interior of the belt backing airbag 42 that is accommodated inside the cover member 40 in the folded up state and disposed at the side of the shoulder belt 22A at which the occupant P is disposed (the rear face side).

Accordingly, as shown in FIG. 1 to FIG. 3, the belt backing airbag 42 inflates and expands so as to extend in the seat width direction, between the shoulder belt 22A and the shoulder areas Ps of the occupant P. Therefore, the inflated and expanded belt backing airbag 42 is disposed between the shoulder belt 22A and at least both shoulder areas Ps of the occupant P including the clavicles, that is, at the rear side of the shoulder belt 22A and at the front side of both shoulder areas Ps of the occupant P.

As shown in FIG. 6, at the time of frontal collision of the vehicle, the belt backing airbag 42 moves to the front side to follow the occupant P who is moving to a front side due to inertial force in association with the collision, and the belt backing airbag 42 restrains at least both shoulder areas Ps including the clavicles of the occupant P. That is, the shoulder belt 22A is a member that receives reaction force from the belt backing airbag 42.

The extension and contraction portion 34A of the gas supply tube 34 for supplying the gas from the inflator 32 to the belt backing airbag 42 extends to follow the movement of the belt backing airbag 42 to the front side. The strap 36 resiliently deforms so as to also extend to follow the movement of the belt backing airbag 42 to the front side. Therefore, there is no risk of the position of the belt backing airbag 42 being limited by the gas supply tube 34, and the belt backing airbag 42 moves to the upper side along the shoulder belt 22A due to resilient restoring force of the strap 36 associated with the movement of the occupant P to the front side. Thus, the position of the belt backing airbag 42 is adjusted and the state in which the belt backing airbag 42 is interposed between the shoulder area Ps of the occupant P and the shoulder belt 22A is maintained That is, when the belt backing airbag 42 moves to the inflection position of the shoulder belt 22A at the shoulder area Ps of the occupant P, the belt backing airbag 42 is nipped between the shoulder belt 22A and the shoulder area Ps at the inflection portion and is restricted so as not to move further to the upper-rear side. As a result, the belt backing airbag 42 may be continuingly disposed at the targeted shoulder area Ps of the occupant P including the clavicle. Therefore, regardless of physical build of the occupant P, the belt backing airbag 42 may be continuingly retained between the shoulder belt 22A and both shoulder areas Ps of the occupant P, and at least both shoulder areas Ps of the occupant P may be continuingly restrained effectively from an earlier stage to a later stage of the occupant restraint.

According to this belt backing airbag 42, a suitable restraint force on the shoulder area Ps at the side away from the shoulder belt, at which the shoulder belt 22A is not worn, may be produced promptly. Thus, a localized load applied from the shoulder belt 22A to the occupant P may be dispersed to both shoulder areas Ps via the belt backing airbag 42 (and principally braced by the clavicles) at an early stage. Therefore, even with a simple structure, application of a localized load to the chest area Pc of the occupant P from the shoulder belt 22A may be moderated, and both shoulder areas Ps of the occupant P may be restrained efficiently.

The shoulder belt 22A may be lifted from the chest area Pc of the occupant P by the thickness of the inflated and expanded belt backing airbag 42, forming a predetermined gap between the shoulder belt 22A and the chest area Pc of the occupant P. Therefore, a localized load acting from the shoulder belt 22A on the chest area Pc of the occupant P may be moderated. Therefore, particularly for women and occupants with relatively low chest durability such as older people, a chest injury value due to movement to the vehicle front side being impeded by the shoulder belt 22A may be reduced.

The belt backing airbag 42 inflates and expands so as to extend in the seat width direction and restrains both shoulder areas Ps of the occupant P. One or both of a height or a thickness at least at the end portion of the belt backing airbag 42 at the side that is disposed at the shoulder belt 22A is increased more than at other portions of the belt backing airbag 42. Therefore, compared to a structure in which a height or a thickness at the end portion of the belt backing airbag 42 at the side that is disposed at the shoulder belt 22A are the same as at the other portions, an interference amount (a contact area) of the belt backing airbag 42 with the shoulder area Ps of the occupant P at the side at which the shoulder belt 22A is disposed may be increased. As a result, the belt backing airbag 42 is easily kept at the inflection position of the seatbelt 22 at the shoulder area Ps of the occupant P regardless of physical build of the occupant P.

The belt backing airbag 42 is disposed in the folded up state at the side of the shoulder belt 22A at which the occupant is disposed (the rear face side). The inflator 32, which supplies gas to the belt backing airbag 42, and the seatbelt 22 are provided at the vehicle seat 12. That is, components structuring the occupant restraint device for a vehicle 10 are provided at the vehicle seat 12. Therefore, installing the vehicle seat 12 is sufficient for equipping a vehicle with the occupant restraint device for a vehicle 10. Thus, equipping the occupant restraint device for a vehicle 10 may be simple.

Figures 7A, 7B:
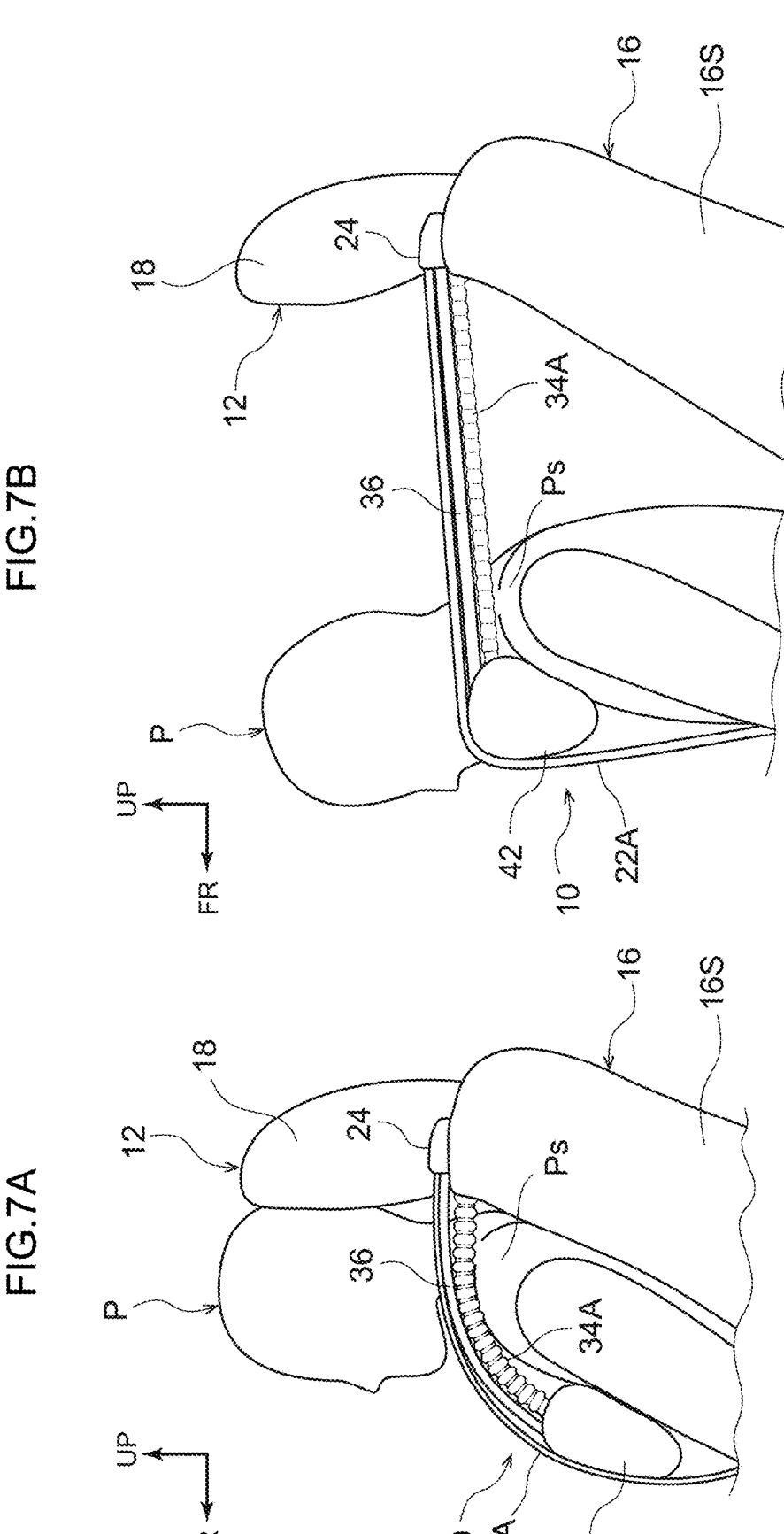
FIG. 7A is a schematic side view showing a state of a belt backing airbag of an occupant restraint device for a vehicle according to a variant example of the first exemplary embodiment at the time of inflation and expansion.
FIG. 7B is a schematic side view showing a time of occupant restraint of the occupant restraint device for a vehicle according to the variant example of the first exemplary embodiment.

Even if a position of the inflated and expanded belt backing airbag 42 is specified to be at the lower side relative to the targeted shoulder area PS of the occupant P (for example, at the chest area Pc) as shown in FIG. 7A, when the belt backing airbag 42 moves to the front side together with the movement of the occupant P to the front side, as shown in FIG. 7B, the belt backing airbag 42 is moved to the upper side along the shoulder belt 22A by the resilient restoring force of the strap 36, and the belt backing airbag 42 is retained at the targeted inflection position at the shoulder area Ps of the occupant P. Thus, during occupant restraint, the belt backing airbag 42 may be continuingly disposed at the shoulder area Ps of the occupant P including the clavicle.

Second Exemplary Embodiment

Now, a second exemplary embodiment is described. Portions that are the same as in the first exemplary embodiment are assigned the same reference symbols and detailed descriptions thereof (including operations that are the same) are omitted as appropriate.

Figures 8A, 8B:
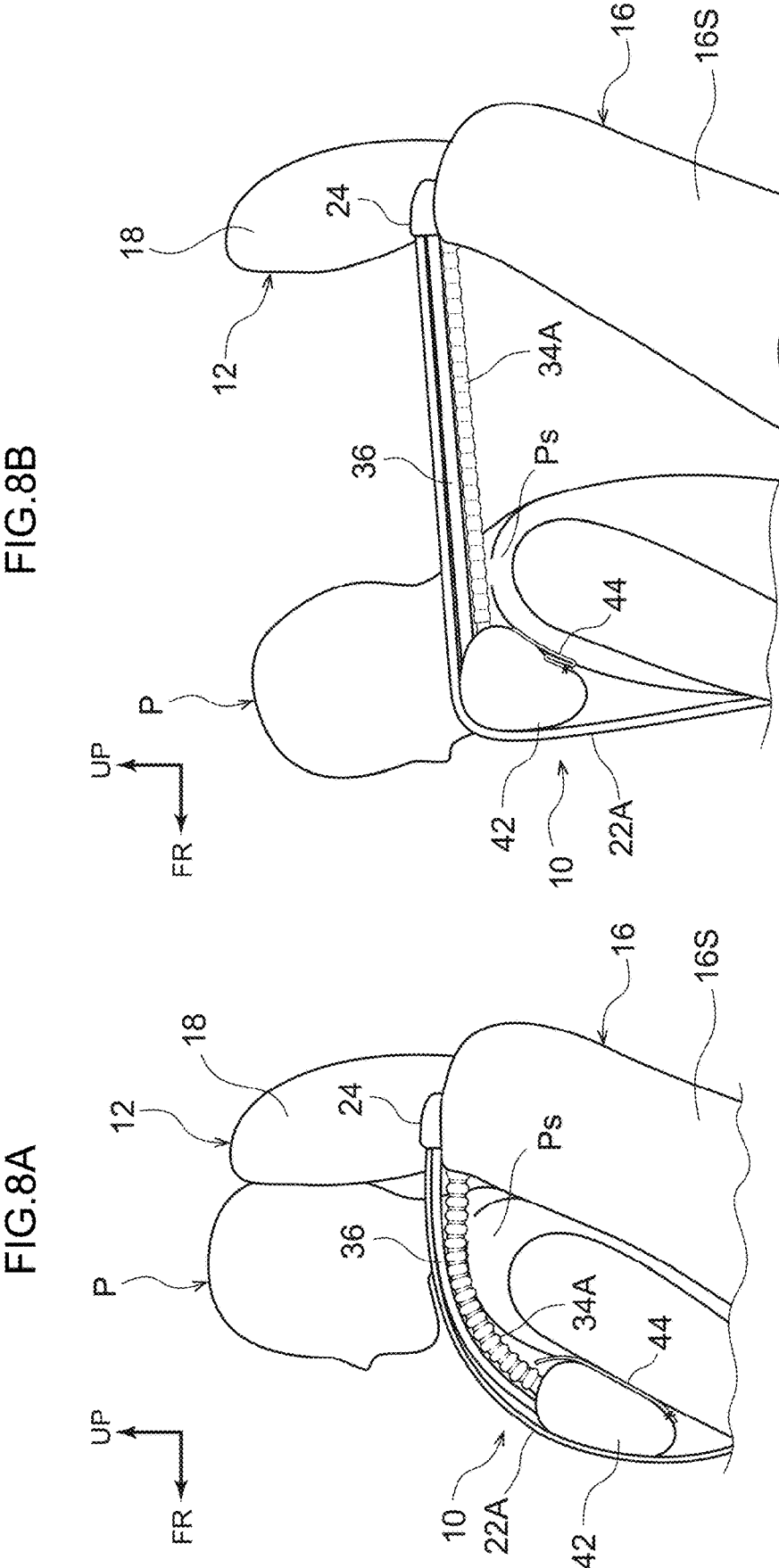
FIG. 8A is a schematic side view showing a state of a belt backing airbag of an occupant restraint device for a vehicle according to a second exemplary embodiment at a time of inflation and expansion.
FIG. 8B is a schematic side view showing a time of occupant restraint of the occupant restraint device for a vehicle according to the second exemplary embodiment.

As shown in FIG. 8A and FIG. 8B, the occupant restraint device for a vehicle 10 according to the second exemplary embodiment differs from the first exemplary embodiment described above only in that the belt backing airbag 42 includes a slip cloth 44 interposed between the belt backing airbag 42 and the occupant P. That is, the slip cloth 44 is formed, of a fabric that slides easily or a fabric that is coated so as to slide easily, so as to have a larger area than the belt backing airbag 42 in front view. A lower end portion of the slip cloth 44 is fixed by sewing or the like to a lower portion of the belt backing airbag 42 at the side thereof at which the occupant P is disposed. Thus, the slip cloth 44 is interposed between the belt backing airbag 42 and the occupant P.

When the slip cloth 44 is provided, the belt backing airbag 42 easily moves to the inflection position of the shoulder belt 22A at the shoulder area Ps of the occupant P. More specifically, when the belt backing airbag 42 moves to the front side together with the movement of the occupant P to the front side, the belt backing airbag 42 may be quickly moved along the shoulder belt 22A to the inflection position at the shoulder area Ps of the occupant P by the resilient restoring force of the strap 36. Therefore, the belt backing airbag 42 is likely to be continuingly disposed at the shoulder area Ps of the occupant P including the clavicle during occupant restraint.

Third Exemplary Embodiment

Now, a third exemplary embodiment is described. Portions that are the same as in the above-described first exemplary embodiment and second exemplary embodiment are assigned the same reference numerals and, as appropriate, are not described in detail (including operations that are the same).

Figure 9:
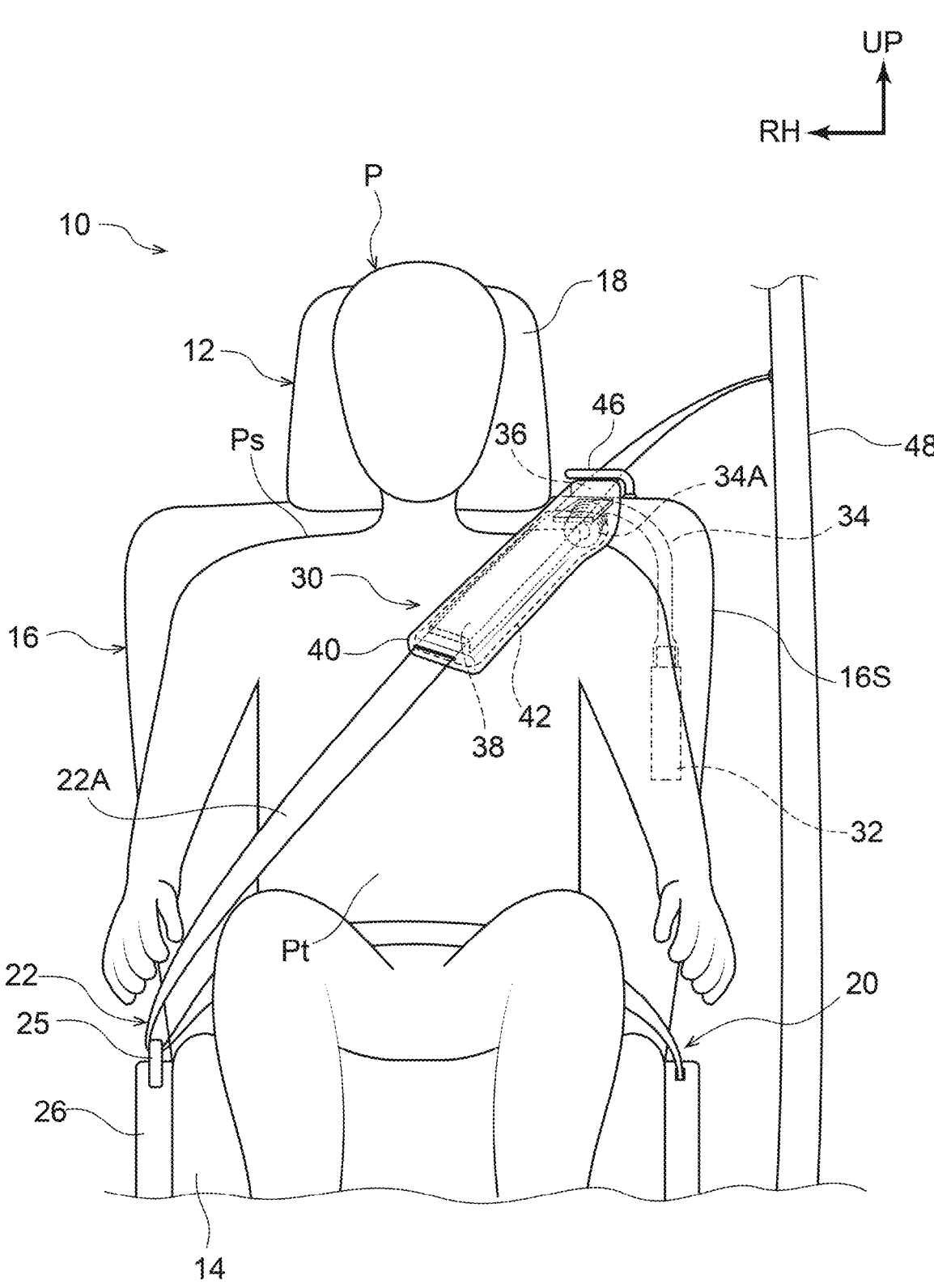
FIG. 9 is a schematic front view showing a state of a belt backing airbag of an occupant restraint device for a vehicle according to a third exemplary embodiment at a usual time.
Figure 10:
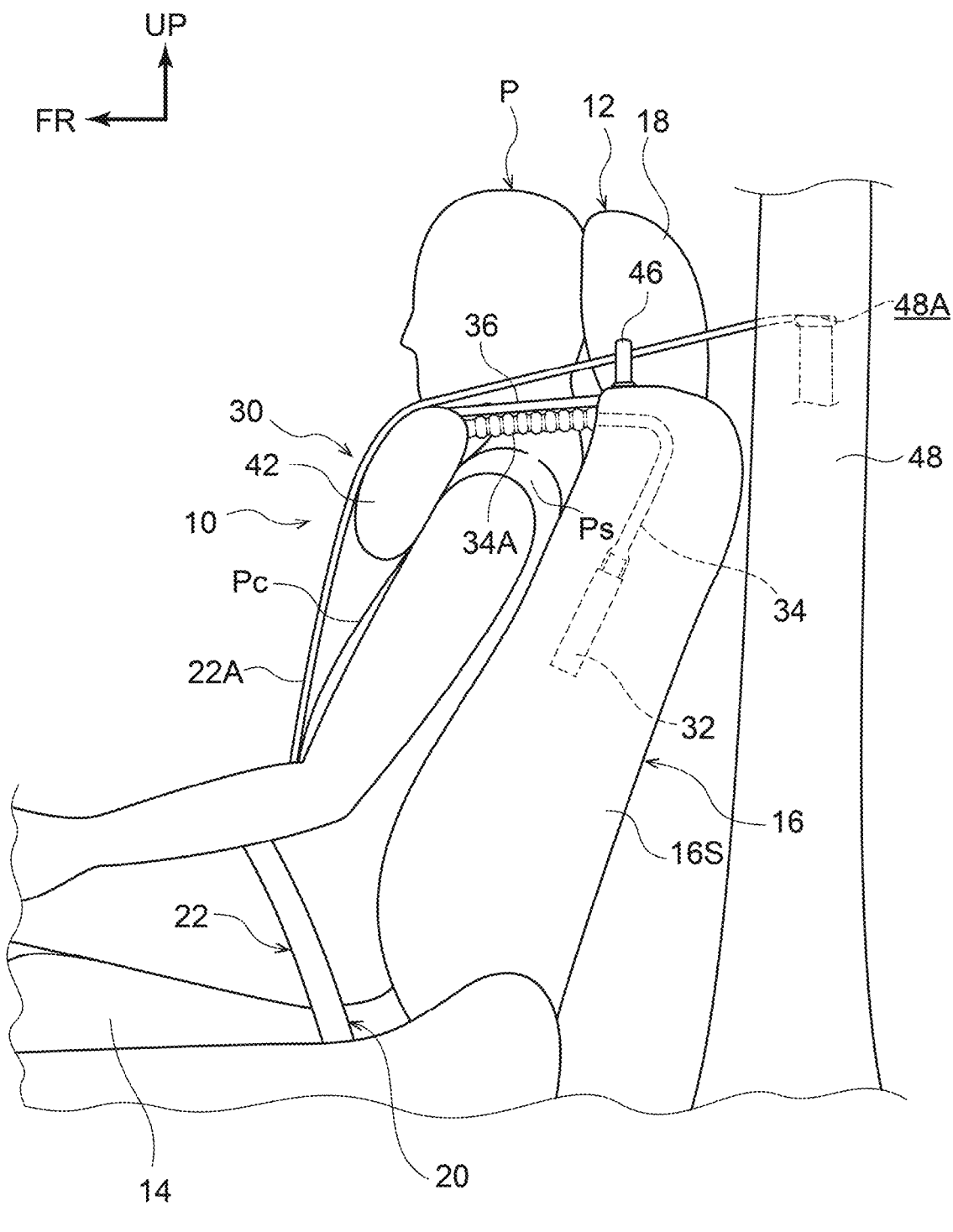
FIG. 10 is a schematic side view showing a state of the belt backing airbag of the occupant restraint device for a vehicle according to the third exemplary embodiment at a time of inflation and expansion.

As shown in FIG. 9 and FIG. 10, the occupant restraint device for a vehicle 10 according to the third exemplary embodiment differs from the first exemplary embodiment described above only in the following respects. The seatbelt 22 is structured to enable pulling out thereof through a belt aperture portion 48A provided at a center pillar 48 (see FIG. 10). A belt path of the shoulder belt 22A is corrected by a belt guide 46 such that the shoulder belt 22A is worn at a front side of the shoulder area Ps of the occupant P. The belt guide 46 is provided in an inverted "L" shape in front view at an upper end face of the seat back 16 of the vehicle seat 12. Although not shown in the drawings, the retractor 28 is provided inside the center pillar 48.

Thus, even though the seatbelt apparatus 20 including the seatbelt 22 and the retractor 28 is not integrated with the vehicle seat 12, because the belt guide 46 is provided at the upper end face of the seat back 16 of the vehicle seat 12, the belt backing airbag 42 may be continuingly disposed between the shoulder belt 22A and the shoulder area Ps of the occupant P including the clavicle regardless of physical build of the occupant P. Thus, the shoulder area Ps including the clavicle of the occupant P may continue to be restrained effectively.

Fourth Exemplary Embodiment

Now, a fourth exemplary embodiment is described. Portions that are the same as in the above-described first to third exemplary embodiments are assigned the same reference numerals and, as appropriate, are not described in detail (including operations that are the same).

Figure 11A:
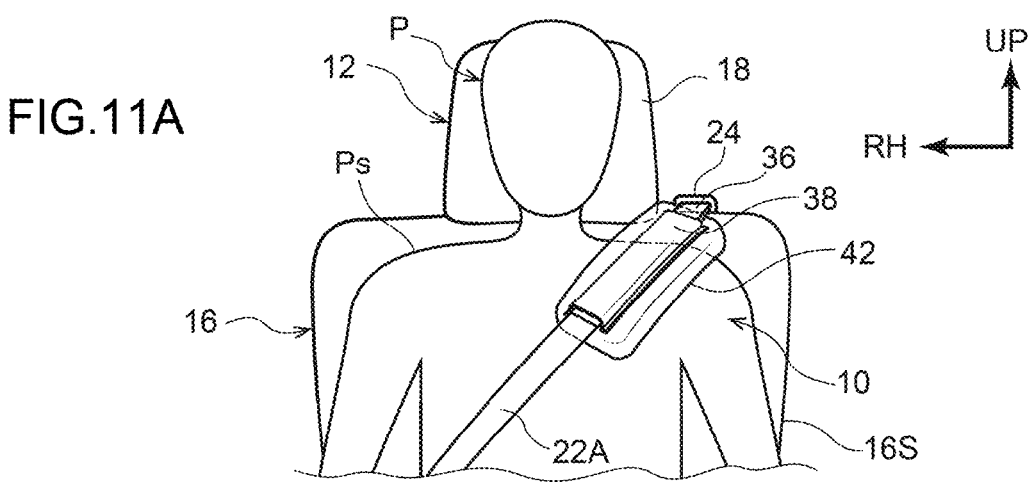
FIG. 11A is a schematic front view showing a state of a belt backing airbag of an occupant restraint device for a vehicle according to a fourth exemplary embodiment at a time of inflation and expansion.

As shown in FIG. 11A, the occupant restraint device for a vehicle 10 according to the fourth exemplary embodiment differs from the first exemplary embodiment described above only in that a shape of the belt backing airbag 42 in front view at the completion of inflation and expansion is a shape that covers only the shoulder area Ps, at the side of the occupant P at which the shoulder belt 22A is disposed, along the belt path of the shoulder belt 22A.

That is, the belt backing airbag 42 is formed in a substantially rectangular shape in front view with a predetermined length and thickness larger than the shoulder belt 22A. Accordingly, fabrication costs of the belt backing airbag 42 may be reduced, and just the shoulder area Ps, including the clavicle, at the side of the occupant P at which the shoulder belt 22A is disposed may be restrained and protected effectively.

Fifth Exemplary Embodiment

Now, a fifth exemplary embodiment is described. Portions that are the same as in the above-described first to third exemplary embodiments are assigned the same reference numerals and, as appropriate, are not described in detail (including operations that are the same).

Figure 11B:
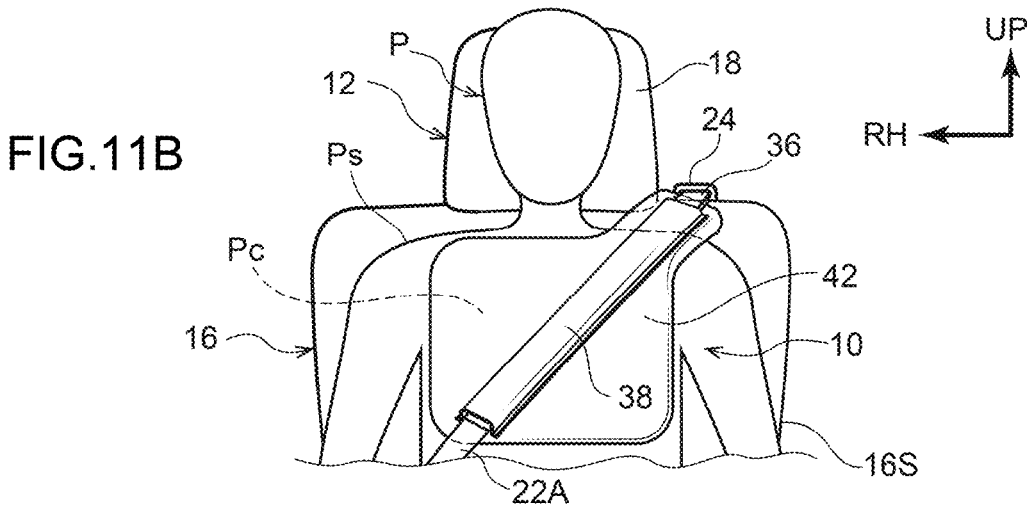
FIG. 11B is a schematic front view showing a state of a belt backing airbag of an occupant restraint device for a vehicle according to a fifth exemplary embodiment at a time of inflation and expansion.

As shown in FIG. 11B, the occupant restraint device for a vehicle 10 according to the fifth exemplary embodiment differs from the first exemplary embodiment described above only in that the shape of the belt backing airbag 42 in front view at the completion of inflation and expansion is a shape that covers the whole of the chest area Pc of the occupant P, including both shoulder areas Ps.

That is, the belt backing airbag 42 is formed in a substantially rectangular shape in front view so as to be capable of restraining and protecting not just the shoulder areas Ps of the occupant P but both shoulder areas Ps and the chest area Pc. Accordingly, although fabrication costs of the belt backing airbag 42 are increased, the shoulder areas Ps and the chest area Pc of the occupant P may be restrained and protected effectively. In this case, in some embodiments, the guide member 38 is formed with a length matching a vertical direction length of the belt backing airbag 42.

Sixth Exemplary Embodiment

Lastly, a sixth exemplary embodiment is described. Portions that are the same as in the above-described first to third exemplary embodiments are assigned the same reference numerals and, as appropriate, are not described in detail (including operations that are the same).

Figure 11C:
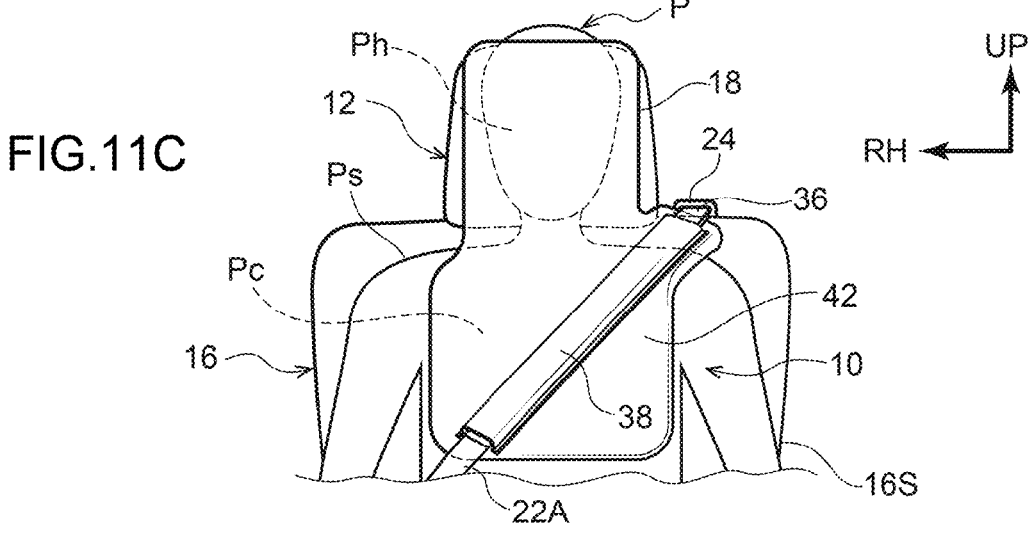
FIG. 11C is a schematic front view showing a state of a belt backing airbag of an occupant restraint device for a vehicle according to a sixth exemplary embodiment at a time of inflation and expansion.

As shown in FIG. 11C, the occupant restraint device for a vehicle 10 according to the sixth exemplary embodiment differs from the first exemplary embodiment described above only in that the shape of the belt backing airbag 42 in front view at the completion of inflation and expansion is formed as a shape that covers not just the shoulder areas Ps and chest area Pc of the occupant P but from the chest area Pc to a head area Ph of the occupant P.

That is, the belt backing airbag 42 is formed in a shape that, in addition to the shape according to the fifth exemplary embodiment, extends further to the upper side by a predetermined length and is formed in a substantially rectangular shape in front view whose longer direction is the vertical direction. Accordingly, although fabrication costs of the belt backing airbag 42 are increased, in addition to the shoulder areas Ps and chest area Pc of the occupant P, the head area Ph may also be restrained and protected effectively.

Hereabove, the occupant restraint device for a vehicle 10 according to the present exemplary embodiments is described by reference to the drawings. However, the occupant restraint device for a vehicle 10 according to the present exemplary embodiments is not limited to the structures shown in the drawings; suitable design modifications may be applied within a scope not departing from the gist of the present disclosure. For example, the other end portion of the gas supply tube 34 may be a structure that projects through the bezel 24. If the vehicle seat 12 is a rear seat that is not slidable, the other end portion of the strap 36 may be attached to the vehicle body rather than to the vehicle seat 12.

When the seatbelt apparatus 20 is installed at the vehicle seat 12, the shoulder belt 22A does not necessarily need to be worn on the shoulder area at the vehicle width direction outer side. That is, the occupant restraint device for a vehicle 10 according to the present exemplary embodiments may be applied to a structure in which the shoulder belt 22A is worn on the shoulder area at the vehicle width direction inner side. Furthermore, the belt backing airbag 42 is not limited to a structure in which two base cloths are superposed and the peripheral edge portions are sewn together. The belt backing airbag 42 may have a structure in which three or more base cloths are used and peripheral edge portions thereof are sewn together. Furthermore, the material of the guide member 38 is not limited to a silicon-based resin material with a high slidability characteristic. An alternative material may be employed provided the material has desirable slidability.

The occupant restraint device for a vehicle 10 according to the present exemplary embodiments may be formed by suitably combining structures of the first to sixth exemplary embodiments. For example, the slip cloth 44 according to the second exemplary embodiment may be employed at the belt backing airbag 42 according to any of the third to sixth exemplary embodiments, and the belt backing airbag 42 according to any of the fourth to sixth exemplary embodiments may be applied to the belt backing airbag 42 according to the first exemplary embodiment or the second exemplary embodiment.

What is claimed is:

1. An occupant restraint device for a vehicle, comprising:
a seatbelt configured to restrain an occupant sitting on a vehicle seat, at the vehicle seat; and
a belt backing airbag configured to, when gas is supplied to the belt backing airbag from an inflator at a time of frontal collision of the vehicle, inflate and expand between at least a shoulder belt of the seatbelt and a shoulder area of the occupant, the belt backing airbag configured to move along the shoulder belt together with moving to a vehicle front side to follow the occupant moving to the vehicle front side due to inertial force, and the belt backing airbag configured to maintain a state in which the belt backing airbag is interposed between at least the shoulder area of the occupant and the shoulder belt,
wherein the belt backing airbag is linked to the vehicle seat or a vehicle body via a cord-shaped member that is resiliently deformable, the cord-shaped member configured to extend to follow movement of the occupant to the vehicle front side.

2. The occupant restraint device for a vehicle according to claim 1, wherein the belt backing airbag is connected with the inflator via a gas supply tube that is extensible to follow the movement of the occupant to the vehicle front side.

3. The occupant restraint device for a vehicle according to claim 2, wherein the seatbelt is structured to enable pulling out from a belt aperture portion provided at a pillar, a belt guide is provided at a seat back of the vehicle seat, and a belt path is corrected by the belt guide such that the shoulder belt is configured to be worn at a front side of the shoulder area of the occupant.

4. The occupant restraint device for a vehicle according to claim 2, wherein the belt backing airbag inflates and expands so as to extend in a seat width direction and configured to restrain both shoulder areas of the occupant, together with which at least one of a height or a thickness at least at an end portion of the belt backing airbag at a side of the shoulder belt is increased more than at other portions of the belt backing airbag.

5. The occupant restraint device for a vehicle according to claim 2, wherein a shape in a front view of the belt backing airbag at completion of inflation and expansion is formed as at least one of a shape configured to cover the shoulder area of the occupant along the shoulder belt, a shape configured to cover both shoulder areas and a chest area of the occupant, or a shape configured to cover from the chest area to a head area of the occupant.

6. The occupant restraint device for a vehicle according to claim 1, wherein the belt backing airbag includes a slip cloth configured to be interposed between the occupant and the belt backing airbag.

7. The occupant restraint device for a vehicle according to claim 6, wherein a lower end portion of the slip cloth is fixed to a lower portion of the belt backing airbag at a side of the slip cloth which is configured to face the occupant.

8. The occupant restraint device for a vehicle according to claim 1, wherein the seatbelt is structured to enable pulling out from a belt aperture portion provided at a pillar, a belt guide is provided at a seat back of the vehicle seat, and a belt path is corrected by the belt guide such that the shoulder belt is configured to be worn at a front side of the shoulder area of the occupant.

9. The occupant restraint device for a vehicle according to claim 1, wherein the belt backing airbag inflates and expands so as to extend in a seat width direction and configured to restrain both shoulder areas of the occupant, together with which at least one of a height or a thickness at least at an end portion of the belt backing airbag at a side of the shoulder belt is increased more than at other portions of the belt backing airbag.

10. The occupant restraint device for a vehicle according to claim 1, wherein a shape in a front view of the belt backing airbag at completion of inflation and expansion is formed as at least one of a shape configured to cover the shoulder area of the occupant along the shoulder belt, a shape configured to cover both shoulder areas and a chest area of the occupant, or a shape configured to cover from the chest area to a head area of the occupant.

11. The occupant restraint device for a vehicle according to claim 2, wherein the belt backing airbag includes a slip cloth configured to be interposed between the occupant and the belt backing airbag.

12. The occupant restraint device for a vehicle according to claim 11, wherein a lower end portion of the slip cloth is fixed to a lower portion of the belt backing airbag at a side of the slip cloth which is configured to face the occupant.

* * * * *